United States Patent
Yoshikawa et al.

(10) Patent No.: US 6,919,286 B2
(45) Date of Patent: Jul. 19, 2005

(54) ALUMINUM NITRIDE CERAMICS, MEMBERS FOR USE IN A SYSTEM FOR PRODUCING SEMICONDUCTORS, AND CORROSION RESISTANT MEMBERS

(75) Inventors: Jun Yoshikawa, Nagoya (JP); Yuji Katsuda, Stuttgart (DE)

(73) Assignee: NGK Insulators, Inc., Nagoya (JP)

( * ) Notice: Subject to any disclaimer, the term of this patent is extended or adjusted under 35 U.S.C. 154(b) by 100 days.

(21) Appl. No.: 10/308,221

(22) Filed: Nov. 26, 2002

(65) Prior Publication Data

US 2003/0130106 A1 Jul. 10, 2003

(30) Foreign Application Priority Data

Nov. 26, 2001 (JP) ..................................... P2001-358971
Oct. 3, 2002 (JP) ..................................... P2002-290683

(51) Int. Cl.⁷ .................... C04B 35/582; C04B 35/5835
(52) U.S. Cl. ..................... 501/98.4; 501/96.4; 501/98.6
(58) Field of Search ............................. 501/98.4, 98.5, 501/98.6, 96.4

(56) References Cited

U.S. PATENT DOCUMENTS

| 3,649,314 A | * | 3/1972 | James | 501/96.4 |
|---|---|---|---|---|
| 5,457,075 A | * | 10/1995 | Fukushima et al. | 501/96.4 |
| 5,767,028 A | * | 6/1998 | Komatsu et al. | 501/98.5 |
| 6,001,760 A | * | 12/1999 | Katsuda et al. | 501/98.4 |
| 6,156,686 A | * | 12/2000 | Katsuda et al. | 501/96.1 |
| 6,239,402 B1 | | 5/2001 | Araki et al. | 219/121.4 |
| 6,486,085 B1 | * | 11/2002 | Katsuda et al. | 501/98.4 |

FOREIGN PATENT DOCUMENTS

| JP | 09393524 | * 10/1990 |
|---|---|---|
| JP | 4-332831 | * 11/1992 |
| JP | 05-178671 | 7/1993 |
| JP | 2000-044345 | 2/2000 |
| JP | 2001-181050 | 7/2001 |
| JP | 2001322874 | * 11/2001 |

* cited by examiner

Primary Examiner—Karl Group
(74) Attorney, Agent, or Firm—Burr & Brown

(57) ABSTRACT

An aluminum nitride ceramic is provided, including 0.5 to 10 weight percent of boron atoms and 0.1 to 2.5 weight percent of carbon atoms. The ceramic has a room temperature volume resistivity not lower than $1 \times 10^{14} \Omega \cdot cm$, and a volume resistivity at 500° C. of not lower than $1 \times 10^{8} \Omega \cdot cm$. An a-axis lattice constant of the aluminum nitride in the ceramic is not shorter than 3.112 angstrom and a c-axis lattice constant of the aluminum nitride is not shorter than 4.980 angstrom.

19 Claims, 4 Drawing Sheets

US 6,919,286 B2

ALUMINUM NITRIDE CERAMICS, MEMBERS FOR USE IN A SYSTEM FOR PRODUCING SEMICONDUCTORS, AND CORROSION RESISTANT MEMBERS

This application claims the benefits of Japanese Patent Application P2001-358971 filed on Nov. 26, 2001 and P2002-290683 filed on Oct. 3, 2002, the entireties of which are incorporated by reference.

BACKGROUND OF THE INVENTION

1. Field of the Invention

The present invention relates to an aluminum nitride series ceramic having a high volume resistivity and a member for a system for producing semiconductors and a corrosion resistant member applying such a ceramic.

2. Related Art Statement

Aluminum nitride sintered bodies have a corrosion resistant property against a halogen has and have thus been utilized as a base material of various members for semiconductors producing systems. It is further needed that a base material for a ceramic heater has a specified insulating property and thermal conductivity in a specific operating temperature range. Aluminum nitride sintered bodies have an insulating property and a high thermal conductivity and thus have been utilized as a base material for ceramic heaters for heating silicon wafers. A dense aluminum nitride sintered body usually has a volume resistivity of about $10^{13}\Omega\cdot cm$ at room temperature, for example, and not higher than $10^7 \Omega\cdot cm$ at 500° C. An aluminum nitride sintered body having a volume resistivity of, for example, not lower than $10^8 \Omega\cdot cm$ at 500° C., has thus been demanded.

The assignee filed Japanese patent publication 2000-44345A and disclosed a novel method of producing an aluminum nitride sintered body. In the disclosure, a magnesium component is added to raw material of aluminum nitride power to provide a sintered body having a high corrosion resistant property and volume resistivity.

Magnesium, however, is an alkaline earth metal element and has been considered to be not desirable in semiconductor production processes. In addition, it may be difficult to give a solution for a process carried out at a higher temperature range by the above method using a magnesium component.

SUMMARY OF THE INVENTION

An object of the present invention is to increase the volume resistivity of an aluminum nitride ceramic.

Another object of the present invention is to increase the volume resistivity of an aluminum nitride ceramic in a high temperature range so as to improve the insulating property in a high temperature range.

The present invention provides an aluminum nitride ceramic containing 0.5 to 10 weight percent of boron atoms and 0.1 to 2.5 weight percent of carbon atoms and having a volume resistivity at room temperature of not lower than $1\times10^{14}\Omega\cdot cm$.

The present invention further provides an aluminum nitride ceramic containing 0.5 to 10 weight percent of boron atoms and 0.1 to 2.5 weight percent of carbon atoms and having a volume resistivity at 500° C. of not lower than $1\times10^8\Omega\cdot cm$.

The present invention further provides an aluminum nitride ceramic wherein an a-axis lattice constant of aluminum nitride is not shorter than 3.112 angstrom and a c-axis lattice constant of aluminum nitride is not shorter than 4.980 angstrom.

The present invention further provides an aluminum nitride ceramic produced by sintering a mixture containing at least aluminum nitride and boron carbide and having a volume resistivity at room temperature of not lower than $1\times10^{14}\Omega\cdot cm$.

The present invention further provides an aluminum nitride ceramic produced by sintering a mixture containing at least aluminum nitride and boron carbide and having a volume resistivity at 500° C. of not lower than $1\times10^8\Omega\cdot cm$.

The present invention provides a member comprising at least the aluminum nitride ceramic for use in a semiconductor producing system.

The present invention further provides a corrosion resistant member comprising the aluminum nitride ceramic.

The inventors have tried to add various additives to aluminum nitride ceramics and have studied the effects of the additives on the volume resistivity both at room temperature and a high temperature range. They have reached the following findings.

That is, the volume resistivity of an aluminum nitride ceramic may be increased to a value not lower than $1\times10^{14}\Omega$ cm at room temperature by adding a predetermined amount of boron carbide into raw material of the sintered body. Further, they found that the volume resistivity at 500° C. may be increased to a value not lower than $1\times10^8\Omega\cdot cm$, so that an excellent insulating property may be obtained at a high temperature range. The present invention is based on the findings.

The inventors further investigated the requirements for an aluminum nitride ceramic to enable an increase in the volume resistivity. They have found that relatively large amounts of carbon and oxygen atoms are solid-soluted in aluminum nitride grains, as described in the "Examples" section. Therefore, carbon and oxygen atoms are solid-soluted in aluminum nitride grains to increase the resistivity of the aluminum nitride ceramic.

The inventors measured the lattice constants of aluminum nitride by X-ray diffraction measurement based on this. It was finally found that the volume resistivity of the ceramic may be improved by increasing the a-axis and c-axis lattice constants of aluminum nitride to predetermined critical values. The results show that the crystalline lattices of aluminum nitride are enlarged as carbon and oxygen atoms are solid-soluted in the lattices. That is, according to the present invention, the a-axis lattice constant is made not lower than 3.112 angstrom and c-axis lattice constant is made not lower than 4.980 angstrom.

The intergranular phase of the aluminum nitride ceramic having an increased volume resistivity was mainly boron nitride (BN). The intergranular phase is substantially plate-shaped and elongated along the interface of adjacent aluminum nitride grains, and forms an isolated phase (dispersed phase) between the aluminum nitride grains. The intergranular phase does not substantially affect the volume resistivity of the aluminum nitride ceramic.

In a sintering step, the following process may proceed. Boron carbide reacts with gaseous nitrogen to generate boron nitride as an intergranular phase, and carbon atoms are diffused and solid-soluted in aluminum nitride grains. Oxygen atoms present in the aluminum nitride raw materials may be solid-soluted into the aluminum nitride grains at the same time.

The inventors added boron nitride power into aluminum nitride powdery raw material and sintered the body. In this case, an intergranular phase mainly consisting of boron nitride is formed along the interface of the aluminum nitride grains. An increase of volume resistivity due to carbon and oxygen atoms solid-soluted into aluminum nitride grains was not observed.

Further, the inventors tried to add carbon powder into the aluminum nitride powdery raw material so as to diffuse carbon atoms into the aluminum nitride grains. In this case, however, the carbon atoms dissipate or remain in the intergranular phase. The amount of carbon atoms solid-soluted into aluminum nitride grains is small and is insufficient for enlarging the crystalline lattice of the aluminum nitride. The observation supports the following theory. That is, boron carbide and gaseous nitrogen react to generate highly active carbon atoms, which are diffused into aluminum nitride grains.

Further, in Japanese patent publication P5-178, 671A, boron carbide ($B_4C$) in an amount of 0.5 weight percent, calculated as boron, is added into aluminum nitride powder and the powder is then sintered at 1800° C. A sintered body having a thermal conductivity of 153 W/m·K and a relative density of 98.9 percent is thus obtained. Boron carbide is added for inhibiting the crystalline growth and improving the surface smoothness. The relationship between the addition of boron carbide and volume resistivity is not described. According to the study of the inventors, in the case of adding such a small amount of boron carbide, the solid solution of carbon and oxygen atoms into aluminum nitride grains does not substantially affect the lattice constants and the volume resistivity of the aluminum nitride ceramic.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

DETAILED DESCRIPTION OF THE INVENTION

Figure 1:
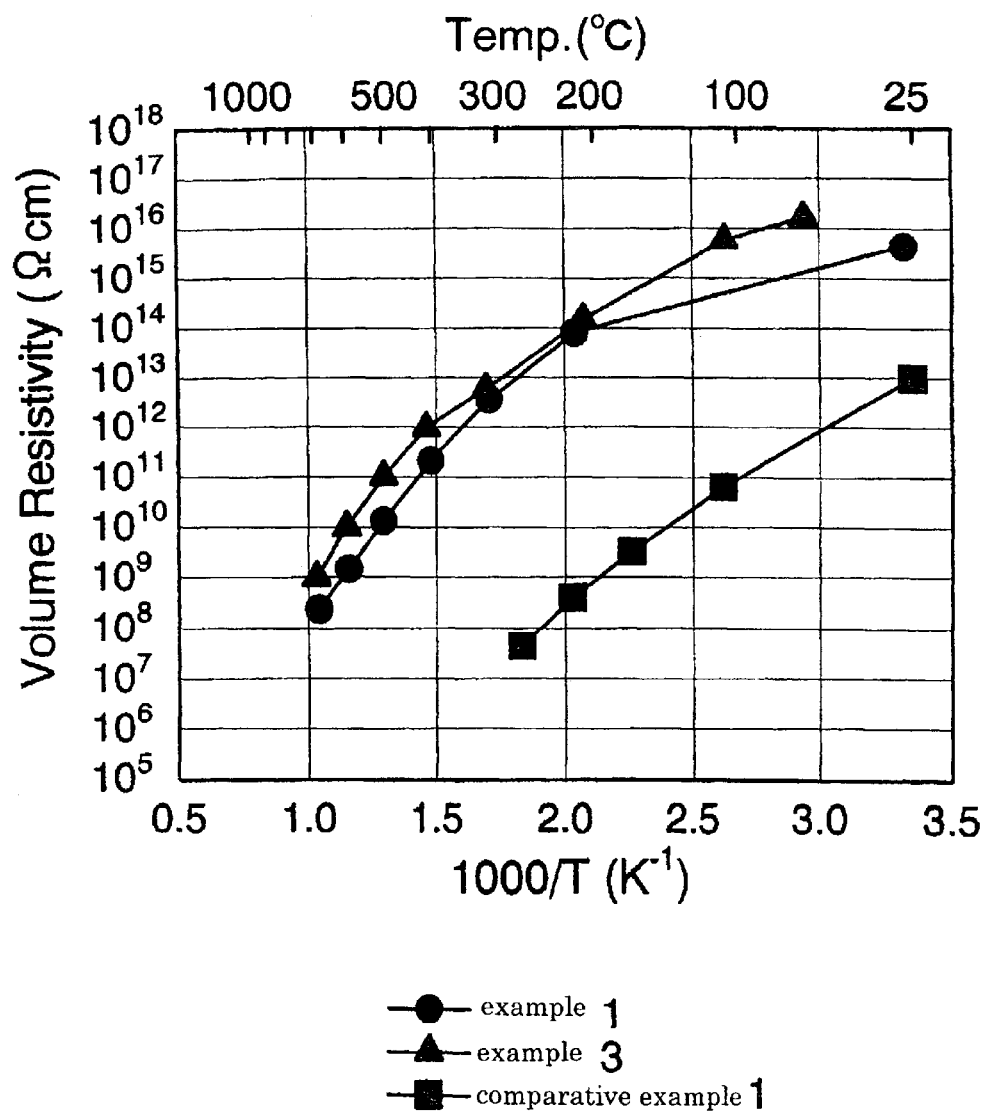
FIG. 1 is a graph showing the temperature dependence of the volume resistivity in samples according to Examples 1, 3 and Comparative Example 1.

The present invention will be described further in detail.

An aluminum nitride ceramic according to the present invention means a ceramic material mainly consisting of a polycrystalline body composed of aluminum nitride. The process for producing the ceramic is not particularly limited, and includes gaseous phase processes such as chemical vapor deposition, physical vapor deposition, organic metal chemical vapor deposition and vapor deposition. The aluminum nitride ceramic may preferably be produced by sintering.

The content of aluminum in the aluminum nitride ceramic should be sufficient to form an aluminum nitride phase as the main phase. The content is preferably not lower than 35 weight percent, and more preferably, not lower than 50 weight percent, of the aluminum nitride ceramic.

The content of aluminum nitride is preferably not lower than 80 weight percent, and more preferably, not lower than 90 weight percent in the aluminum nitride ceramic.

The resistivity of aluminum nitride ceramic may be further improved by increasing the content of boron atoms to a value not lower than 0.5 weight percent and the content of carbon atoms to a value not lower than 0.1 weight percent in an aluminum nitride series ceramic. From this viewpoint, the content of boron atoms is preferably not lower than 0.8 weight percent, or the content of carbon atoms is preferably not lower than 0.3 weight percent.

The thermal conductivity of the aluminum nitride ceramic may be increased by reducing the content of boron atoms to a value not higher than 10 weight percent. From this viewpoint, the content of boron atoms is preferably not higher than 5 weight percent. Moreover, the thermal conductivity of the aluminum nitride ceramic may be increased by reducing the content of carbon atoms to a value not higher than 2.5 weight percent. From this viewpoint, the content of carbon atoms is preferably not higher than 1.5 weight percent.

In a preferred embodiment, the ratio of the contents (by weight) of carbon atoms to boron atoms (C/B) is controlled at a value not lower than 0.1 and not higher than 0.5. It is thereby possible to further increase the volume resistivity of an aluminum nitride series ceramics.

According to the present invention, the volume resistivity at room temperature of the aluminum nitride series ceramic is $1 \times 10^{14} \Omega \cdot cm$ or higher. The volume resistivity at room temperature is not lower than $5 \times 10^{14} \Omega \cdot cm$, and further, not lower than $1 \times 10^{15} \Omega \cdot cm$.

Further, in the present invention, the volume resistivity at 500° C. of the aluminum nitride series ceramic is not lower than $1 \times 10^8 \Omega \cdot cm$. Further, the volume resistivity at 500° C. is not lower than $5 \times 10^8 \Omega \cdot cm$.

Further, in the present invention, the volume resistivity at 700° C. of the aluminum nitride series ceramic is not lower than $1 \times 10^7 \Omega \cdot cm$. Further, the volume resistivity at 700° C. is more preferably not lower than $5 \times 10^7 \Omega \cdot cm$.

In a preferred embodiment, an a-axis lattice constant of the aluminum nitride is not lower than 3.112 angstrom and a c-axis lattice constant is not lower than 4.980 angstrom. It is thereby possible to increase the volume resistivity of the aluminum nitride series ceramic. From this viewpoint, the a-axis lattice constant is preferably not lower than 3.113 angstrom, or, the c-axis lattice constant is preferably not lower than 4.981 angstrom.

The aluminum nitride ceramic according to the present invention, particularly a sintered body, preferably contains a rare earth element in an amount of 0.1 to 10 weight percent. It is thereby possible to obtain a higher volume resistivity at a lower sintering temperature compared with ceramics having no added rare earth element. From this viewpoint, the content of a rare earth element is preferably not lower than 0.2 weight percent and not higher than 8 weight percent. The addition of a rare earth element is also effective for improving the thermal conductivity.

The term "rare earth element" refers to the following seventeen elements: samarium; scandium; yttrium; lanthanum; cerium; praseodymium; neodymium; promethium; europium; gadolinium; terbium; dysprosium; holmium; erbium; thulium; ytterbium; and lutetium.

In a preferred embodiment, the rare earth element is one or more elements selected from the group consisting of yttrium, lanthanum, cerium, neodymium, samarium, gadolinium, dysprosium, erbium and ytterbium.

To provide a highly corrosive resistant sintered body that is suitable for applications in which the contamination of impurities is to be highly controlled (such as an application for producing semiconductors), the total content of metal elements (excluding aluminum and rare earth elements) is preferably not higher than 100 ppm, in some cases. The total content is more preferably not higher than 50 ppm.

In a preferred embodiment, the percentage of open porosity of the aluminum nitride series ceramic is not higher than 5 percent, and more preferably, not higher than 0.1 percent.

In a preferred embodiment, the thermal conductivity of the aluminum nitride series ceramic according to the present invention is not lower than 30 W/m·K. The upper limit of the thermal conductivity is not limited and may be 150 W/m·K, for example.

In a preferred embodiment, the aluminum nitride series ceramic contains an intergranular phase mainly consisting of boron nitride. The following crystalline phases may be generated other than boron nitride phase:

(1) A composite oxide phase of a rare earth element and aluminum. The composite oxide phase may preferably have garnet or perovskite crystalline structure; and (2) A boride of a rare earth element.

The inventors have found that the volume resistivities at room and high temperatures of the aluminum nitride ceramic may be further increased by controlling the ratio (a/b) of the oxygen content ("a" weight percent) solid-soluted in aluminum nitride grains to the carbon content ("b" weight percent) in the ceramic to be not lower than 0.25 and not higher than 2.0. The (a/b) ratio is preferably not lower than 0.4, and more preferably, not lower than 0.5 for further increasing the volume resistivities at room and high temperatures of the ceramic. Alternatively, the (a/b) ratio is preferably not higher than 1.8, and more preferably, not higher than 1.5.

The (a/b) ratio may be adjusted by controlling the oxygen content in the aluminum nitride raw material and the amount of boron carbide added into the raw material.

The inventors have further found that the thermal conductivity of the aluminum nitride ceramic may be considerably improved by reducing the oxygen content in the aluminum nitride grains solid-soluted to a value not higher than 0.5 weight percent. It is thereby possible to increase the thermal conductivity of the aluminum nitride ceramic to a value not lower than 90 W/mK, and more preferably, not lower than 100 W/mK.

To further improve the thermal conductivity of the aluminum nitride series ceramic, the content of the solid-soluted oxygen is preferably not higher than 0.4 weight percent, and more preferably, not higher than 0.3 weight percent.

Aluminum nitride raw materials may be produced by various processes, including direct nitriding, reduction nitriding and gaseous phase synthesis from an alkyl aluminum.

Boron carbide may be added to the aluminum nitride raw material. When a rare earth element is added, an oxide form of the rare earth element may be added to the aluminum nitride raw material. Alternatively, a compound of the rare earth element that forms a rare earth oxide upon heating (e.g., a precursor of a rare earth element) may be added to the aluminum nitride raw material. Suitable precursors include a rare earth element nitrate, sulfate, oxalate and alkoxide. The precursor may be added as powder. A precursor such as a nitrate or sulfate may be dissolved into a solvent to obtain a solution, which may be added into the raw material. It is thereby possible to uniformly disperse atoms of the rare earth element between aluminum nitride particles by dissolving the precursor in a solvent.

The raw material may be shaped by any known method, including dry press, doctor blade, extrusion, casting and tape forming methods.

In a formulating step, the aluminum nitride raw powder may be dispersed in a solvent, into which the rare earth element and boron carbide may be added in a powder form or the solution described above. In a mixing step, it is possible to simply stir the powder. When the raw powder contains aggregates, it is possible to use a mixing and pulverizing machine, such as a pot mill, trommel and attrition mill, to pulverize the aggregates. When using an additive that is soluble in a solvent for pulverizing, it is enough to carry out the mixing and pulverizing step for a short (minimum) time. Further, a binder component, such as polyvinyl alcohol, may be added.

The solvent used for the mixing step may be dried, preferably by a spray dry method. After carrying out a vacuum drying process, the particle size distribution of the dried mixtures may preferably be adjusted by passing the particles through a mesh.

In a step of forming the powdery material, the material may be pressing using a metal mold to provide a disk-shaped body. The pressure for pressing raw material is not particularly limited, as long as the shaped body may be handled without causing any fracture. The pressure is preferably not lower than 100 kgf/cm$^2$. The powdery material may be contained in a die for hot pressing without particularly shaping the powdery material.

The sintered body according to the present invention may preferably be produced by hot pressing the body to be sintered, preferably at a pressure of not lower than 50 kgf/cm$^2$.

The sintering temperature is not limited, and is preferably 1700 to 2200° C., and more preferably, not lower than 1750° C. or not higher than 2100° C. The sintering temperature is most preferably 1750 to 2050° C.

In a sintering step, the temperature is preferably held at a holding temperature between 1400 to 1700° C. before sintering at a maximum temperature to further improve the thermal conductivity of the ceramics.

The aluminum nitride ceramic according to the invention may preferably be used for various members in a semiconductor producing system, such as systems for treating silicon wafers and for manufacturing liquid crystal displays. Such a semiconductor producing system means a system that can be used in a wide variety of semiconductor processes in which metal contamination of a semiconductor is to be avoided. Such systems include film forming, etching, cleaning and testing systems.

The aluminum nitride series ceramic according to the present invention may be used as a corrosion resistant member. The corrosion resistant member may be used against corrosive substances such as a liquid including nitric acid, hydrochloric acid, mixed acid, hydrofluoric acid and aqua regia. The corrosion substance further includes a chlorine-based corrosive gas such as $Cl_2$, $BCl_3$, $ClF_3$, $HCl$ or the like and a fluorine-based corrosive gas such as $ClF_3$ gas, $NF_3$ gas, $CF_4$ gas, $WF_6$, $SF_4$ or the like. The corrosion resistant member is particularly useful against the plasma of each gas.

The member for a semiconductor producing system may preferably be a corrosion resistant member such as a susceptor for the system. The inventive ceramic may be preferred for a metal-embedded article having an anti-corrosion member and a metal member embedded therein. The corrosion resistant member includes a susceptor for mounting a semiconductor wafer thereon, a dummy wafer, a shadow ring, a tube for generating high frequency plasma, a dome for generating high frequency plasma, a high frequency wave-permeable window, an infrared radiation-permeable window, a lift pin for supporting a semiconductor wafer, a shower plate, an electrostatic chuck and a vacuum chuck. A resistive heating element, electrostatic chuck electrode or an electrode for generating high frequency plasma may be provided in the susceptor.

The aluminum nitride ceramic according to the present invention has a high volume resistivity at a high temperature, as described above. The ceramic may thus be particularly useful for ceramic heaters designed for high temperature use. Such ceramic heaters may be appropriately used under a maximum temperature of, for example, 1000° C.

Further, the aluminum nitride ceramic according to the invention has a relatively high volume resistivity of about $10^7$ to $10^9 \Omega \cdot cm$ at 700° C., and may be useful as a material for an electrostatic chuck in such a high temperature range. That is, in an electrostatic chuck utilizing Johnson-Rahbec force, it is desired to adjust the volume resistivity of a substrate material to a value of not lower than $1 \times 10^8 \Omega \cdot cm$ and not higher than $1 \times 10^{13} \Omega \cdot cm$ for obtaining a high chucking force and improved response. From this viewpoint, the aluminum nitride ceramic according to the present invention has a volume resistivity in the range described above in a temperature range of for example 300 to 800° C., and particularly, 400 to 700° C. The ceramic is thus useful as a material for an electrostatic chuck designed for use in such a high temperature range. Further, the ceramic has a high volume resistivity at room temperature and is useful as a material for an electrostatic chuck utilizing Coulomb force.

EXAMPLES (1) Production of Mixed Powder of $AlN/B_4C/Y_2O_3$:

Commercial AlN powder produced by reduction nitriding or gaseous phase synthesis was used. Commercial $B_4C$ powder having a high purity and a mean particle diameter of not larger than 2 μm was used. Commercial powder of $Y_2O_3$ with a purity of not lower than 99.0 percent and a mean particle diameter of not larger than 1 μm was used.

Each powder was weighted as shown in Tables 1 and 3. The amounts of $B_4C$ and $Y_2O_3$ were converted to weight parts provided that the amount of aluminum nitride was converted to 100 weight parts. Each weighed powder was then subjected to wet blending using isopropyl alcohol as a solvent, a nylon pot and nylon balls for 4 hours to obtain slurry. After the blending, the slurry was collected and dried at 110° C. in nitrogen atmosphere to obtain powdery raw material. The amounts of AlN, $B_4C$ and $Y_2O_3$ in the formulation were calculated as "weight parts" ignoring the contents of impurities in each powder.

(2) Forming and Sintering Steps:

Each mixed powder obtained in section (1) and was then formed by uniaxial pressing at a pressure of 200 kgf/cm² to obtain a disk-formed body with a diameter of about 50 mm and a thickness of about 20 mm, which was then contained in a mold made of graphite for sintering.

Each formed body was sintered by hot pressing at a pressure of 200 kgf/cm² and a maximum temperature of 1800 to 2000° C. for 4 hours and then cooled. In some examples, a temperature holding step was introduced before reaching the maximum sintering temperature. Temperature was held at 1500 or 1600 or 1700° C. for 20 hours in the holding step. During the sintering, the formed body was set in vacuum from room temperature to 1000° C. to each sintering (maximum) temperature shown in the tables.

(3) Evaluation:

The obtained sintered bodies were subjected to the following evaluations.

Density and open porosity were measured by Archimedes+ method using water as a medium.

Relative density was calculated by the following formula:

(Bulk density)×100/(Theoretical density calculated based on the composition of the mixed raw material).

Volume resistivity was measured by a method according to "JIS C 2141" from room temperature to about 700° C. under vacuum. The test sample had the following parts: a circular plate with a diameter ϕ of 50 mm and thickness of 1 mm; a main electrode with a diameter of 20 mm; a guard electrode with an inner diameter of 30 mm and outer diameter of 40 mm; and an applying electrode with a diameter of 45 mm. The electrode were formed of silver. 500 V/mm of voltage was applied and a current was read one minute after the application of voltage so that the volume resistivity was calculated.

Bending strength was measured using a four-point bending strength at room temperature according to "JIS R1601."

Thermal conductivity was measured by a laser flash method and calculated. The specific heat value (753 J/kg·K) of aluminum nitride was used for the calculation.

Lattice constants were measured by a WPPD method applying known lattice constants of $Al_2O_3$ as an internal standard. The measurements were performed using a rotating anode type X-ray diffraction system "RINT" supplied by "Rigaku Denki" under the following conditions: CuK α1 (monochromatized by Ge incident monochrometer), 50 kV, 300 mA, and 2θ=30 to 120°.

The contents of B and Y were determined by inductively coupled plasma (ICP) spectrometry.

The oxygen and nitrogen contents were determined by an inert gas melting infrared absorptiometry analysis method.

The carbon content ("b" weight percent) was determined by a high frequency heating infrared absorptiometry analysis method.

The crystalline phase was determined by a rotating anode type X-ray diffraction system "RINT" supplied by "Rigaku Denki" under the following condition: CuKα, 50 kV, 300 mA, and 2θ=10 to 70°.

In the observation of microstructure, the distribution of each element was analyzed by EPMA.

The total oxygen content in the aluminum nitride grains ("a" weight percent) in each sintered body was measured by chemical analysis. The content of Y was determined by inductively coupled plasma (ICP) spectrometry. The Y content was converted to the content of $Y_2O_3$ so that the content in $Y_2O_3$ was calculated. The oxygen content in $Y_2O_3$ was subtracted from the total content (obtained by chemical analysis) in each sintered body to obtain a calculated oxygen content ("a" weight percent) in grains.

The (a/b) ratio was calculated as follows. The carbon content ("b" weight percent) in each sintered body was determined by high frequency heating infrared absorptiometry analysis method. The "a" value was divided by the "b" value.

TABLE 1

| | | | sintering condition | | | properties of sintered body | | | | | | | |
|---|---|---|---|---|---|---|---|---|---|---|---|---|---|
| | B4C | Y2O3 | | | holding step | | | | | | | | |
| example | amount added parts by weight | amount added parts by weight | maximum temperature °C. | holding time | before sintering at maximum temperature | open porosity % | apparent density g/cm3 | bulk density g/cm3 | relative density % | resistivity at room temperature Ω·cm | 500° C. resistivity Ω·cm | 600° C. resistivity Ω·cm | 700° C. resistivity Ω·cm |
| 1 | 3.4 | 2 | 2000 | 4 | 1500° C. × 20 hr | 0.02 | 3.19 | 3.19 | 98.2 | 3E+15 | 1E+10 | 1E+09 | 2E+08 |
| 2 | 3.4 | 2 | 2000 | 4 | None | 0.01 | 3.20 | 3.20 | 98.5 | 5E+15 | 3E+10 | 3E+09 | 4E+08 |
| 3 | 2.3 | 2 | 2000 | 4 | None | 0.00 | 3.23 | 3.23 | 99.0 | 4E+15 | 1E+11 | 9E+10 | 9E+08 |
| 4 | 1.1 | 2 | 2000 | 4 | None | 0.01 | 3.24 | 3.24 | 99.1 | 5E+15 | 7E+08 | 4E+07 | 8E+06 |
| 5 | 5.7 | 2 | 2000 | 4 | None | 0.00 | 3.17 | 3.17 | 98.3 | 2E+15 | 6E+09 | 6E+08 | 8E+07 |
| 6 | 3.4 | 0 | 2000 | 4 | 1500° C. × 20 hr | 0.03 | 3.17 | 3.17 | 98.2 | 2E+15 | 2E+10 | 2E+09 | 2E+08 |
| 7 | 3.4 | 2 | 1800 | 4 | 1500° C. × 20 hr | 0.01 | 3.19 | 3.19 | 98.0 | 2E+15 | 5E+10 | 5E+09 | 6E+08 |
| 8 | 3.4 | 5 | 2000 | 4 | None | 0.01 | 3.23 | 3.23 | 98.4 | 6E+14 | 4E+09 | 4E+08 | 6E+07 |
| 9 | 3.4 | 0 | 2000 | 4 | 1700° C. × 20 hr | 0.02 | 3.13 | 3.13 | 96.9 | 8E+14 | 4E+09 | 4E+08 | 3E+07 |

TABLE 2

| example | bending strength MPa | thermal conductivity W/mK | thermal diffusivity × 1e−5 m2/s | lattice constant a⁻ axis A | lattice constant c⁻ axis A | properties of sintered body (weight percent %) | | | | | | oxygen content in grains weight percent % | | identified intergranular phase YAL:YAlO3 YAM:Y4Al2O9 |
|---|---|---|---|---|---|---|---|---|---|---|---|---|---|---|
| | | | | | | B | N | O | C | Y | C/B | | a/b | |
| 1 | 325 | 58 | 2.4 | 3.1146 | 4.9832 | 2.39 | 32.7 | 0.92 | 0.63 | 1.09 | 0.26 | 0.63 | 0.99 | BN, YB4 |
| 2 | 376 | 43 | 1.8 | 3.1158 | 4.9827 | 2.44 | 31.14 | 1.09 | 0.757 | 1.45 | 0.31 | 0.70 | 0.92 | BN, YB4, YB6 |
| 3 | 308 | 56 | 2.3 | 3.1143 | 4.9829 | 1.67 | 32.26 | 1.08 | 0.553 | 1.38 | 0.33 | 0.71 | 1.28 | BN, YB4 |
| 4 | 303 | 78 | 3.2 | 3.1131 | 4.9822 | 0.83 | 32.83 | 0.84 | 0.336 | 0.88 | 0.40 | 0.60 | 1.79 | BN, YB4, YAL |
| 5 | 361 | 42 | 1.7 | 3.1163 | 4.9841 | 3.95 | 30.8 | 1.09 | 1.2 | 1.2 | 0.30 | 0.77 | 0.64 | BN, YB4 |
| 6 | 324 | 52 | 2.2 | 3.1151 | 4.9820 | 2.56 | 32.66 | 0.73 | 0.796 | — | 0.31 | 0.73 | 0.92 | BN, B4C |
| 7 | 511 | 46 | 1.9 | — | — | — | — | — | — | — | — | — | — | BN, YB4 |
| 8 | 298 | 50 | 2.0 | — | — | — | — | — | — | — | — | — | — | BN, YB4, YAL |
| 9 | 433 | 99 | 4.2 | — | — | — | — | — | — | — | — | — | — | BN |

TABLE 3

| | | | sintering condition | | | properties of sintered body | | | | | | | |
|---|---|---|---|---|---|---|---|---|---|---|---|---|---|
| | B4C | Y2O3 | | | holding step | | | | | | | | |
| | amount added parts by weight | amount added parts by weight | maximum temperature °C. | holding time | before sintering at maximum temperature | open porosity % | apparent density g/cm3 | bulk density g/cm3 | relative density % | resistivity at room temperature Ω·cm | 500° C. resistivity Ω·cm | 600° C. resistivity Ω·cm | 700° C. resistivity Ω·cm |
| example 10 | 1.1 | 2 | 2000 | 4 | None | 0.00 | 3.25 | 3.25 | 99.4 | 5E+15 | 4E+10 | 4E+9 | 5E+8 |
| example 11 | 1.1 | 2 | 1900 | 4 | 1600° C. × 20 hr | 0.4 | 3.24 | 3.24 | 99.0 | 1E+16 | 4E+10 | 4E+9 | 4E+8 |
| comparative example 1 | 0 | 0 | 1900 | 4 | None | 0.03 | 3.27 | 3.27 | 100.2 | 5E+12 | 2E+05 | — | — |
| comparative example 2 | 0.6 B4C | 2 | 2000 | 4 | None | 0.01 | 3.25 | 3.25 | 99.3 | 2E+15 | 5E+07 | 5E+06 | 7E+05 |
| comparative example 3 | 8.5 BN | 2 | 2000 | 4 | None | 0.02 | 3.16 | 3.16 | 99.1 | 1E+15 | 2E+06 | 1E+05 | — |

TABLE 3-continued

| | B4C amount added parts by weight | Y2O3 amount added parts by weight | sintering condition maximum temperature °C. | hold-ing time | holding step before sintering at maximum temperature | open porosity % | appar-ent density g/cm3 | bulk density g/cm3 | relative density % | properties of sintered body resistivity at room temperature Ω·cm | 500° C. resistivity Ω·cm | 600° C. resistivity Ω·cm | 700° C. resistivity Ω·cm |
|---|---|---|---|---|---|---|---|---|---|---|---|---|---|
| comparative example 4 | 0.6 C | 2 | 2000 | 4 | 1500° C. × 210 hr | 0.02 | 3.26 | 3.25 | 99.4 | 4E+14 | 6E+06 | 2E+05 | — |
| comparative example 5 | 0 | 5 | 1900 | 4 | None | 0.07 | 3.31 | 3.31 | 99.8 | 2E+15 | 5E+07 | 2E+06 | — |

TABLE 4

| | bending strength MPa | thermal conductivity W/mK | thermal diffus-ivity × 1e⁻5 m2/s | lattice constant a⁻ axis A | lattice constant c⁻ axis A | properties of sintered body (weight percent %) B | N | O | C | Y | C/B | oxygen content in grains | identified intergranular a/b phase |
|---|---|---|---|---|---|---|---|---|---|---|---|---|---|
| example 10 | 367 | 92 | 3.8 | 3.1129 | 4.9817 | 0.79 | 33.05 | 0.58 | 0.323 | 1.06 | 0.41 | 0.29 | 0.91 — |
| example 11 | 390 | 114 | 4.7 | 3.1123 | 4.9813 | 0.82 | 33.48 | 0.61 | 0.235 | 1.34 | 0.29 | 0.25 | 1.06 — |
| comparative example 1 | 400 | 96 | 3.9 | 3.1117 | 4.9783 | — | 33.59 | 0.67 | 0.03 | — | — | — | — Al2O3 |
| comparative example 2 | 327 | 103 | 4.2 | 3.1123 | 4.9808 | — | — | — | — | — | — | — | — BN, YAL |
| comparative example 3 | 382 | 113 | 4.5 | 3.1115 | 4.9808 | 3.35 | 35.19 | 1.22 | 0.02 | 1.55 | 0.01 | — | — BN, YAL |
| comparative example 4 | 361 | 163 | 6.7 | 3.1118 | 4.9808 | — | — | 0.73 | 0.57 | 0.93 | — | — | — YAL |
| comparative example 5 | 439 | 174 | 7.9 | 3.1117 | 4.9804 | — | 32.25 | 1.48 | 0.024 | 2.73 | — | — | — YAL, YAM |

The experimental results will be explained.

Example 1

Commercial AlN powder (oxygen content is 0.97 percent) produced by reduction nitriding was used. The powdery raw material had a composition of 100/3.4/2 (AlN/B$_4$C/Y$_2$O$_3$:weight parts). The raw material was formed and sintered. In the sintering step, the temperature was elevated at a speed of 1000° C./hours, held at 1500° C. for 20 hours and held at 2000° C. for 4 hours to obtain a dense body having a density of 3.19 g/cm$^3$ and an open porosity of 0.02 percent.

The resulting sample had a volume resistivity of 3×10$^{15}$Ω·cm at room temperature (25° C.), 1×10$^{10}$Ω·cm at 500° C., and 2×10$^8$Ω·cm at 700° C. Abbreviation was applied in the tables for describing a value of volume resistivity as follows. For example, "3×10$^{15}$Ω·cm is described as "3E+15"Ω·cm.

FIG. 1 is a graph showing the dependency of volume resistivity on temperature of the sample according to Example 1. The properties of the samples according to Example 3 and Comparative Example 1 are also shown in FIG. 1. The materials according to the present invention have a higher volume resistivity at any temperature, especially at a high temperature range, compared with the conventional materials.

The sample according to Example 1 has a high strength of 325 MPa and a thermal conductivity of 58 W/m·K. It is speculated that the thermal conductivity is reduced due to many atoms solid-soluted into AlN grains. According to X-ray diffraction analysis, AlN, BN and YB$_4$ phases were identified.

Figure 2:
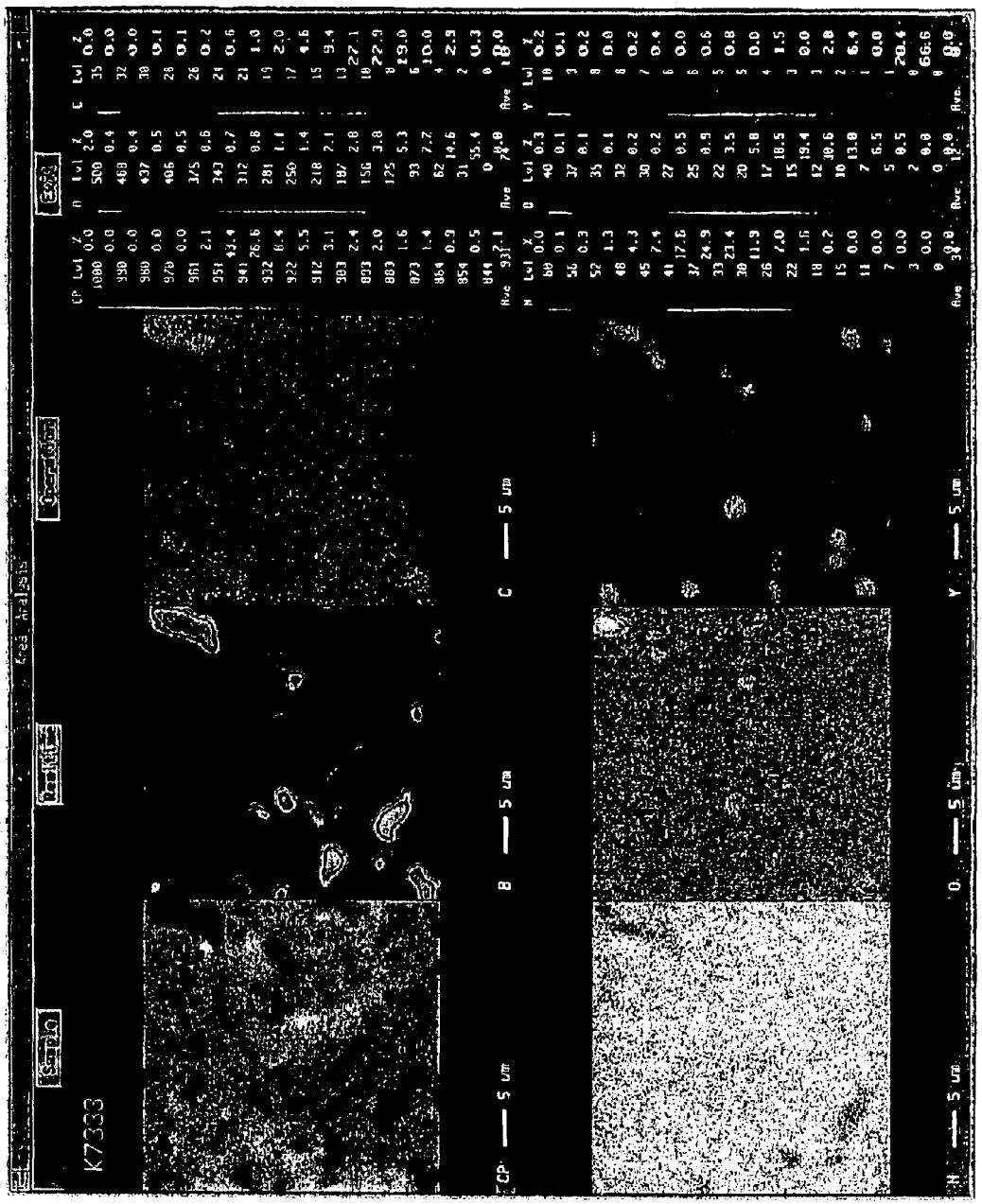
FIG. 2 shows distribution of B, C, O, N and Y atoms in a sample of Example 1 taken by EPMA.
Figure 3:
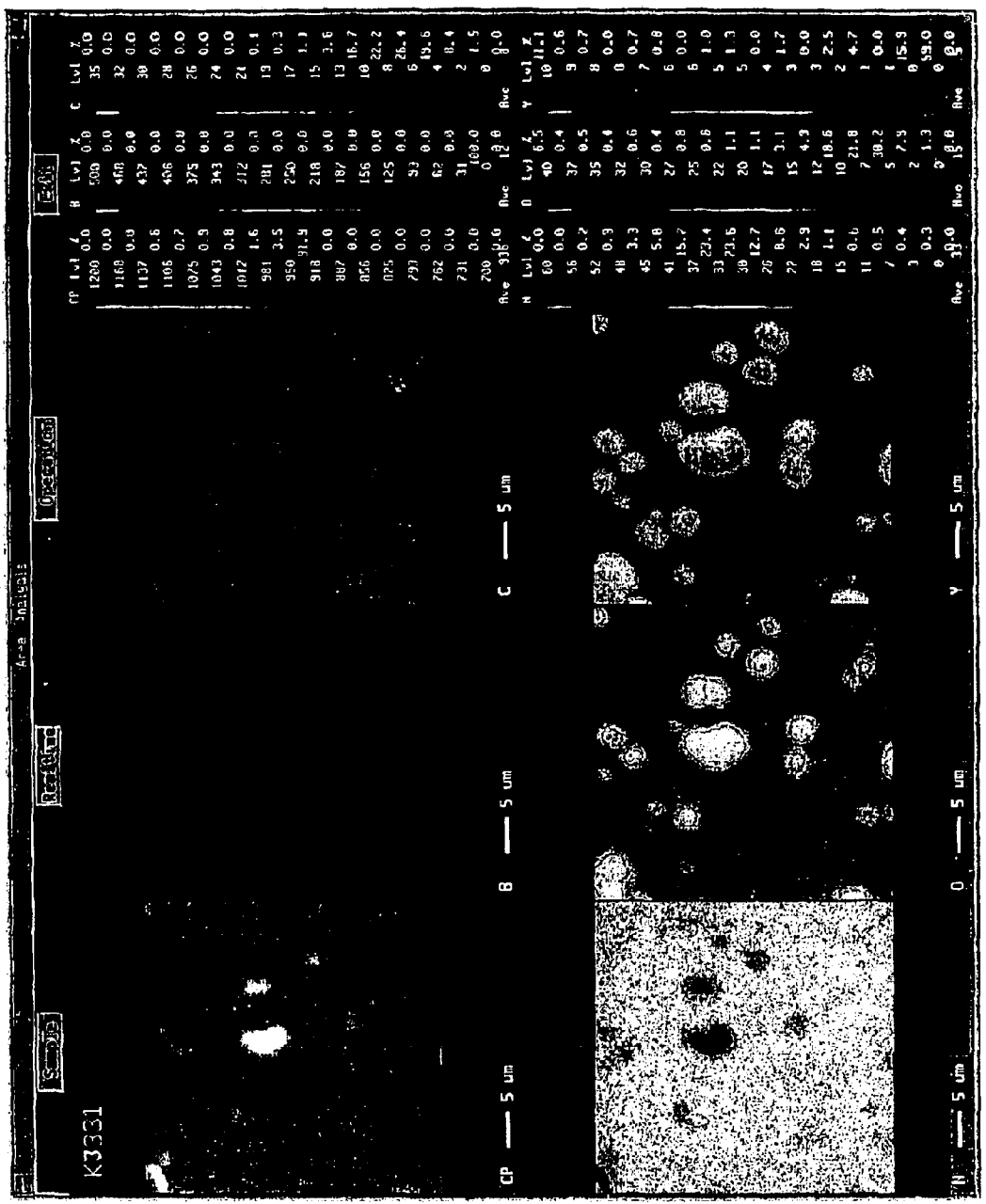
FIG. 3 shows distribution of B, C, O, N and Y atoms in a sample of Comparative Example 5 taken by EPMA.

The distribution of B, C, O, N and Y atoms in the sintered body taken by EPMA is shown in FIG. 2. FIG. 3 shows the distribution in the sample according to Comparative Example 5 as a reference. In the figures, more atoms are present as the brightness is higher (refer to the color tone scale in the right column). As shown in FIG. 2, in Example 1, it was shown that many C and O atoms were present in AlN grains. B atom were not considerably solid-soluted into the AlN grains. In the inventive sample, C and O atoms were solid-soluted into the AlN grains to provide a higher volume resistivity. The mechanism of increasing the volume resistivity due to the solid-soluted C and O atoms into AlN grains is not clear. C and O atoms may be solid-soluted into AlN grains to reduce the carrier density or to generate crystalline defects prohibiting the transfer of the carriers.

Figure 4:
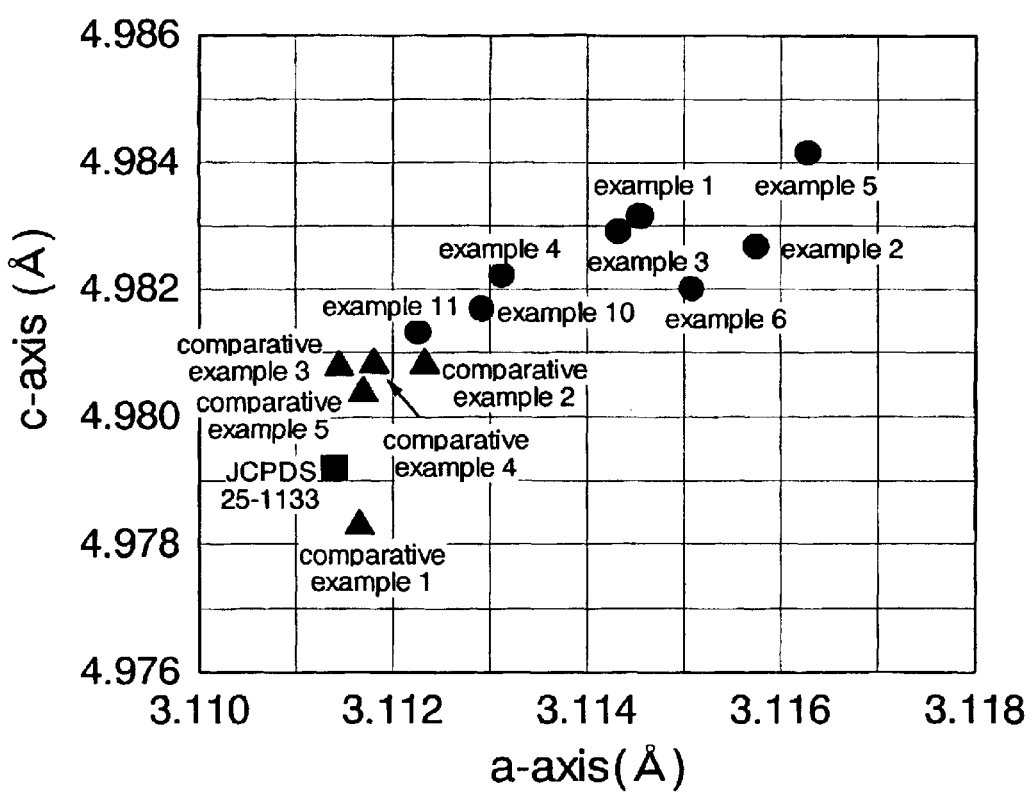
FIG. 4 shows distribution of a-axis and c-axis lattice constants of the inventive and comparative Examples.

The lattice constant of AlN of the sample according to Example 1 are shown in Table 1 and FIG. 4. In the sample according to Example 1, both of "a" and "c" axes considerably expanded compared with those of a conventional sample, indicating the presence of atoms solid-soluted into the AlN grains. The solid-soluted atoms proved to be C and O atoms according to EPMA.

Examples 2 to 9

Commercial AlN powder (oxygen content of 0.97 percent) produced by reduction nitriding was used. In Example 2, the composition of the powdery raw material was the same as Example 1, but the temperature holding step at 1500° C. was omitted. In this case, the volume resistivity of the sample was not substantially changed and thermal conductivity was slightly reduced compared with those in Example 1. The temperature holding step provides a higher thermal conductivity. However, a holding step at about 1600° C. for a long time period may result in continuous intergranular phase that mainly consists of boron nitride containing carbon, so that the volume resistivity may be reduced. It is necessary to avoid such reduction of volume resistivity when the temperature holding step is performed.

In Examples 3 and 4, the manufacturing conditions and amounts of yttria added were the same as in Example 2, except that the $B_4C$ content was reduced. It is possible to obtain a material having a high resistivity and thermal conductivity even when the content of $B_4C$ is reduced.

In Example 5, the manufacturing conditions and amounts of yttria added were the same as in Examples 2, 3 and 4, except that the amount of $B_4C$ added was increased. It is possible to obtain a material having a high resistivity. The volume resistivity was not substantially changed and thermal conductivity was reduced by increasing the added amount of $B_4C$.

In Example 6, the manufacturing conditions and amounts of $B_4C$ added were the same as in Example 2, except that yttria was not added. It is possible to obtain a material having a high resistivity when a rare earth element is not added. A maximum sintering temperature of about 2000° C. is necessary to sufficiently densify the sintered body so that production costs increase.

In Example 7, the amount of $B_4C$ added was the same as in Example 6, but 2 weight percent of yttria was added. In this Example, a liquid phase is generated during the sintering step to reduce the maximum sintering temperature required for sufficient densification to a temperature of about 1800° C.

In Example 8, the amount of $B_4C$ added and the sintering conditions were the same as in Example 2, except that the amount of yttria added was increased to 5 weight percent. It is thereby possible to increase the volume resistivity compared with the sample having a lower added amount of $Y_2O_3$ (Example 2).

In Example 9, the sintering temperature and the composition of powdery raw material were the same as those in Example 6, and the temperature was maintained at 1700° C. in the temperature holding step. The resulting sample had a higher thermal conductivity compared with the sample according to Example 1 in which temperature is maintained at 1500° C.

Examples 10 and 11

Commercial AlN powder (oxygen content of 0.44 percent) produced by gaseous phase process was used. In Examples 10 and 11, the AlN powder having a lower oxygen content was used so that the thermal conductivity was considerably improved to 92 or 114 W/mK. In Examples 10 and 11, the oxygen content in grains was not higher than 0.5 weight percent. On the contrary, in Examples 1 to 6, the oxygen content in grains was relatively large. The oxygen content in grains and thermal conductivity thus clearly correlate with each other. Further, in Examples 1 to 11, the a/c ratio is within 0.25 to 2.0.

Comparative Examples 1 to 5

Commercial AlN powder produced by reduction nitriding (oxygen content of 0.97 percent) was used. Comparative Example 1 provides an AlN sintered body without additives. As shown in FIG. 4, the lattice constants of AlN lattices are not so different compared to JCPDS values (No. 25-1133), and are substantially smaller than those in the Examples. Smaller amounts of C and O atoms are solid-soluted into AlN grains compared with the inventive Examples, resulting in a lower volume resistivity.

In Comparative Example 2, the composition of powdery raw material was 100/0.6/2 ($AlN/B_4C/Y_2O_3$:weight parts). The amount of $B_4C$ added was reduced in this Comparative Example. Although the lattice parameters of AlN lattices changed to some degree compared with JCPDS values, the amounts of C and O atoms solid-soluted into AlN grains were not sufficient, resulting in a reduced volume resistivity.

In Comparative Example 3, commercial BN powder was used instead of $B_4C$ to evaluate the properties of the resulting sintered body. The composition of powdery raw material was 100/8.5/2 ($AlN/BN/Y_2O_3$: weight parts). BN and $YAlO_3$ phases were present other than AlN phase. Such crystalline phases are similar to those shown in the above samples according to the invention Examples with $B_4C$ added. Although the added amount of BN of 8.5 weight percent was considerably larger, the resistivity at 500° C. was as low as $2 \times 10^6 \Omega \cdot cm$. The lattice constants of the AlN lattice were not substantially changed compared with JCPDS values. The content of atoms solid-soluted into AlN grains was small.

In Comparative Example 4, commercial carbon powder with a high purity was used. The properties of the resulting sintered body were measured from comparison. The composition of powdery raw material was 100/0.6/2 ($AlN/C/Y_2O_3$:weight parts). The volume resistivity at 500° C. was as low as $6 \times 10^6 \Omega \cdot cm$. The thermal conductivity was as high as 163 W/m·K and the differences between the lattice constants and JCPDS values were small. It is thus considered that C atoms are not easily solid-soluted into AlN grains in the case of adding carbon powder.

Comparative Example 5 provides a conventional AlN material as a reference material for EPMA measurement. $Y_2O_3$ was added to the AlN material. The thermal conductivity was as high as 174 W/m·K and the differences between the lattice constants of AlN lattice and JCPDS values were small. As shown in the EPMA image in FIG. 3, only small amounts of C and O atoms were solid-soluted into AlN grains.

As described above, the present invention provides an aluminum ceramic having an increased volume resistivity.

The present invention has been explained referring to the preferred embodiments. However, the present invention is not limited to the illustrated embodiments which are given by way of examples only, and may be carried out in various modes without departing from the scope of the invention.

What is claimed is:

1. A sintered body comprising an aluminum nitride ceramic containing 0.5 to 10 weight percent of boron atoms and 0.1 to 2.5 weight percent of carbon atoms and having a volume resistivity at room temperature of not lower than $1 \times 10^{14} \Omega \cdot cm$;

wherein an a-axis lattice constant of aluminum nitride in said aluminum nitride ceramic is at least 3.112 angstrom and a c-axis lattice constant of said aluminum nitride is at least 4.980 angstrom; and wherein said aluminum nitride ceramic has an intergranular phase mainly consisting of boron nitride.

2. The sintered body of claim 1, wherein said aluminum nitride ceramic has a volume resistivity at 500° C. of not lower than $1 \times 10^8 \Omega \cdot cm$.

3. The sintered body of claim 1, wherein a weight ratio of carbon atoms to boron atoms (C/B) is in a range of 0.1 to 0.5.

4. The sintered body of claim 1, wherein said aluminum nitride ceramic has a volume resistivity at 700° C. of not lower than $1\times10^7 \Omega\cdot\text{cm}$.

5. The sintered body of claim 1, wherein said aluminum nitride ceramic contains 0.1 to 10 weight percent of a rare earth element.

6. The sintered body of claim 1, wherein said aluminum nitride ceramic has an open porosity of not higher than 0.1 percent.

7. The sintered body of claim 1, wherein said aluminum nitride ceramic has a thermal conductivity of not lower than 30 W/m·K.

8. The sintered body of claim 1, wherein a ratio (a/b) of an oxygen content ("a" weight percent) that is solid-soluted in aluminum nitride grains of said aluminum nitride ceramic to a carbon content ("b" weight percent) in said aluminum nitride ceramic is not lower than 0.25 and not higher than 2.0.

9. The sintered body of claim 1, wherein a content of oxygen that is solid-soluted into aluminum nitride grains of said aluminum nitride ceramic is not higher than 0.5 percent.

10. The member for use in a system for producing semiconductors comprising sintered body of claim 1.

11. A corrosion resistant member comprising the sintered body of claim 1.

12. A sintered body comprising an aluminum nitride ceramic produced by sintering a mixture containing at least aluminum nitride and boron carbide and having a volume resistivity at room temperature of not lower than $1\times10^{14}\Omega\cdot\text{cm}$;

wherein an a-axis lattice constant of aluminum nitride in said aluminum nitride ceramic is at least 3.112 angstrom and a c-axis lattice constant of said aluminum nitride is at least 4.980 angstrom; and wherein said aluminum nitride ceramic has an intergranular phase mainly consisting of boron nitride.

13. The sintered body of claim 12, wherein said aluminum nitride ceramic has a volume resistivity at 500° C. of not lower than $1\times10^8\Omega\cdot\text{cm}$.

14. The sintered body of claim 12, wherein a weight ratio of carbon atoms to boron atoms (C/B) is in a range of 0.1 to 0.5.

15. The sintered body of claim 12, wherein said aluminum nitride ceramic contains 0.1 to 10 weight percent of a rare earth element.

16. The sintered body of claim 12, wherein a ratio (a/b) of an oxygen content ("a" weight percent) that is solid-soluted in aluminum nitride grains of said aluminum nitride ceramic to a carbon content ("b" weight percent) in said aluminum nitride ceramic is not lower than 0.25 and not higher than 2.0.

17. The sintered body of claim 12, wherein a content of oxygen that is solid-soluted into aluminum nitride grains of said aluminum nitride ceramic is not higher than 0.5 percent.

18. A member for use in a system for producing semiconductors comprising the sintered body of claim 12.

19. A corrosion resistant member comprising the sintered body of claim 12.

* * * * *